United States Patent
Rodriguez et al.

(10) Patent No.: US 10,958,324 B2
(45) Date of Patent: Mar. 23, 2021

(54) TRANSMIT ANTENNA DIVERSITY WIRELESS AUDIO SYSTEM

(71) Applicant: Shure Acquisition Holdings, Inc., Niles, IL (US)

(72) Inventors: Michael Rodriguez, Arlington Heights, IL (US); Robert Mamola, Oak Park, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 16/943,441

(22) Filed: Jul. 30, 2020

(65) Prior Publication Data

US 2021/0044338 A1 Feb. 11, 2021

Related U.S. Application Data

(60) Provisional application No. 62/882,980, filed on Aug. 5, 2019.

(51) Int. Cl.
*H04B 7/06* (2006.01)
*H04L 27/26* (2006.01)
*H04L 1/06* (2006.01)

(52) U.S. Cl.
CPC ......... *H04B 7/0615* (2013.01); *H04L 1/0643* (2013.01); *H04L 1/0668* (2013.01); *H04L 27/2613* (2013.01)

(58) Field of Classification Search
CPC . H04B 7/0615; H04L 1/0643; H04L 27/2613; H04L 1/0668
USPC ............................................. 375/267; 381/77
See application file for complete search history.

(56) References Cited

U.S. PATENT DOCUMENTS

| | | | |
|---|---|---|---|
| 7,212,578 B2 | 5/2007 | Lee |
| 7,792,208 B2 | 9/2010 | Van Zelst |
| 7,889,633 B2 | 2/2011 | Noh |
| 8,000,258 B2 | 8/2011 | Ko |
| 8,270,517 B2 | 9/2012 | Van Zelst |
| 8,295,401 B2 | 10/2012 | Olesen |
| 8,331,347 B2 | 12/2012 | Kishiyama |
| 8,385,246 B2 | 2/2013 | Sawahashi |
| 8,644,262 B1 | 2/2014 | Sun |
| 8,665,987 B2 | 3/2014 | Moulsley |
| 8,670,504 B2 | 3/2014 | Naguib |
| 9,843,467 B2 | 12/2017 | Wang |
| 2006/0077886 A1 | 4/2006 | Oh |
| 2007/0147543 A1 | 6/2007 | Horng |
| 2007/0183533 A1 | 8/2007 | Schmidl |

(Continued)

FOREIGN PATENT DOCUMENTS

| | | |
|---|---|---|
| CN | 101606339 | 12/2009 |
| CN | 101873201 | 10/2010 |

(Continued)

OTHER PUBLICATIONS

International Search Report and Written Opinion for PCT/US2020/044248 dated Oct. 9, 2020, 16 pp.

*Primary Examiner* — Fitwi Y Hailegiorgis
(74) *Attorney, Agent, or Firm* — Neal, Gerber & Eisenberg LLP

(57) ABSTRACT

A wireless audio system including a transmitter using multiple antenna diversity techniques for different signal types is provided. Multipath performance may be optimized, along with improved spectral efficiency of the system.

22 Claims, 8 Drawing Sheets

(56)  References Cited

U.S. PATENT DOCUMENTS

| | | |
|---|---|---|
| 2007/0211822 A1 | 9/2007 | Olesen |
| 2011/0143696 A1 | 6/2011 | Luo |
| 2011/0149942 A1 | 6/2011 | Ko |
| 2011/0280413 A1* | 11/2011 | Wu ..................... H04H 60/43 381/77 |
| 2012/0250558 A1 | 10/2012 | Chung |
| 2017/0085308 A1 | 3/2017 | Sun |
| 2018/0069615 A1 | 3/2018 | Ma |
| 2018/0308505 A1* | 10/2018 | Chebiyyam ........... G10L 19/008 |

FOREIGN PATENT DOCUMENTS

| | | |
|---|---|---|
| CN | 103297106 | 9/2013 |
| EP | 1548970 | 6/2005 |
| EP | 1999861 | 12/2008 |
| EP | 2057757 | 5/2009 |
| EP | 2169863 | 3/2010 |
| EP | 2234286 | 9/2010 |
| EP | 2255457 | 12/2010 |
| EP | 2481248 | 8/2012 |
| EP | 3232582 | 10/2017 |
| WO | 2007049944 | 5/2007 |
| WO | 2008013404 | 1/2008 |
| WO | 2009008180 | 1/2009 |
| WO | 2018186711 | 10/2018 |

* cited by examiner

|  | Input Symbol Pair | Antenna 212a Output | Antenna 212b Output |
|---|---|---|---|
| Pilot symbol | +1, +1 | +1, +1 | +1, -1 |
| Data symbol | $s_{n,0}, s_{n,1}$ | $s_{n,0}, s_{n,1}$ | $s_{n,1}^*, -s_{n,0}^*$ |

TRANSMIT ANTENNA DIVERSITY WIRELESS AUDIO SYSTEM

CROSS-REFERENCE TO RELATED APPLICATION

This application claims priority to U.S. Provisional Patent Application No. 62/882,980, filed on Aug. 5, 2019, the contents of which are fully incorporated herein by reference.

TECHNICAL FIELD

This application generally relates to a wireless audio system that utilizes transmit antenna diversity. In particular, this application relates to a wireless audio system with a transmitter that applies multiple antenna diversity techniques for different signal types.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone or body pack, for example, that is held or worn by the user and includes an integrated transmitter and antenna. As another example, the wireless audio transmitter may be included in an access point or other centralized unit. The wireless audio receiver may be portable, such as a wireless earphone, wireless conference unit, or body pack. When the RF signal is received at the wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, wireless audio components may utilize frequency diversity and/or antenna diversity techniques. For example, wireless audio transmitters may utilize frequency diversity to simultaneously transmit on one antenna two RF signals of two separate frequencies in a combined RF signal, where the two RF signals both include the same audio signal. A wireless audio receiver may then use one or both of the underlying RF signals. As another example, wireless audio receivers may utilize antenna diversity to simultaneously receive RF signals from a wireless audio transmitter on multiple antennas. The received RF signals can be combined to produce a single audio output.

However, utilizing diversity on wireless audio receivers that are portable may be difficult and challenging, due to size and power constraints. For example, portable wireless audio receivers are typically small and battery-powered, so utilizing diversity techniques on such receivers may result in suboptimal antenna placements and/or unacceptable power dissipation. In addition, there may be significant costs and complexity when utilizing diversity techniques on multiple portable wireless audio receivers.

Other techniques for alleviating issues with multipath fading of RF signals may have undesirable side effects. For example, the transmit power of a wireless audio transmitter may be increased to account for a large fading margin. However, the overall spectral efficiency may be negatively impacted due to intermodulation products when the transmit power is increased. Furthermore, the physical design of the transmitter and/or governmental regulations may limit how much the transmit power may be increased. In addition, increased transmit power does not resolve error floors that are caused by frequency-selective fading. As another example, antennas may be designed to the focus transmitted signal energy from wireless audio transmitters to wireless audio receivers. However, such antennas may be excessively directional, which can affect the coverage of the wireless audio transmitters. As a further example, in certain applications (e.g., wireless in-ear personal monitors) ad hoc signal splitting techniques may be utilized in an attempt to improve diversity performance. However, such techniques can create phase cancellation issues that may result in degraded and unreliable performance.

Accordingly, there is an opportunity for a wireless audio system that utilizes transmit antenna diversity that addresses these concerns. More particularly, there is an opportunity for a wireless audio system with a transmitter using multiple antenna diversity techniques for different signal types that can provide optimal multipath performance and improved spectral efficiency.

SUMMARY

The invention is intended to solve the above-noted problems by providing a wireless audio system that utilizes transmit antenna diversity that is designed to, among other things: (1) simultaneously apply different transmit diversity techniques depending on the type of signal being transmitted, such as data/control symbols, pilot symbols, and synchronization signals; (2) utilize embedded orthogonal pilot symbols for independent channel estimation and coherent demodulation while maintaining optimal data rates; and (3) be flexibly encoded and/or routed to multiple antennas for increased coverage and/or capacity.

In an embodiment, a wireless audio transmitter includes a mode selection interface for enabling a user to select one of a plurality of modes of the wireless audio transmitter; a plurality of antennas configured to each transmit an audio signal; an encoder in communication with the mode selection interface, where the encoder is configured to receive (i) a data symbol comprising audio data signals and control signals and (ii) a pilot symbol; a synchronization transformer; and the plurality of converters each in communication with the encoder, the synchronization transformer, and one of the plurality of antennas. The encoder may be further configured to when in a first mode, receive and route the data symbol and the pilot symbol to each of a plurality of converters; and when in a second mode, receive and encode the data symbol and the pilot symbol based on a first diversity technique, and route the encoded data symbol and the encoded pilot symbol to one or more subsets of the plurality of converters.

The synchronization transformer may be configured to receive and transform a synchronization signal based on a second diversity technique. Each of the converters may be configured to when in the first mode, combine the data symbol, the pilot symbol, and the transformed synchronization signal into the audio signal to be transmitted on one of the plurality of antennas; and when in the second mode, combine the encoded data symbol, the encoded pilot symbol, and the transformed synchronization signal into the audio signal to be transmitted on one of the plurality of antennas.

In another embodiment, a method for wirelessly transmitting an audio signal using a wireless audio transmitter may include receiving, from a mode selection interface, a selection of one of a plurality of modes of the wireless audio transmitter; receiving, at an encoder, (i) a data symbol comprising audio data signals and control signals and (ii) a pilot symbol; when the selection is of a first mode, routing the data symbol and the pilot symbol to each of a plurality of converters, using the encoder; and when the selection is of a second mode, encoding the data symbol and the pilot symbol based on a first diversity technique, using the encoder, and routing the encoded data symbol and the encoded pilot symbol to one or more subsets of the plurality of converters, using the encoder. The method may further include receiving, at a synchronization transformer, a synchronization signal; transforming the synchronization signal based on a second diversity technique, using the synchronization transformer; when the selection is of the first mode, combining the data symbol, the pilot symbol, and the transformed synchronization signal into the audio signal to be transmitted on one of the plurality of antennas, using each of the plurality of converters; and when the selection is of the second mode, combining the encoded data symbol, the encoded pilot symbol, and the transformed synchronization signal into the audio signal to be transmitted on one of the plurality of antennas, using the one or more subsets of the plurality of converters.

In a further embodiment, a wireless audio system may include an audio source; a wireless audio transmitter in communication with the audio source; and a wireless audio receiver in wireless communication with the wireless audio transmitter. The audio source may be configured to generate one or more audio source signals each comprising a data symbol comprising audio data signals and control signals. The wireless audio transmitter may include a plurality of antennas configured to each transmit an audio signal; an encoder in communication with the audio source, and configured to receive and encode the data symbol and a pilot symbol based on a first diversity technique; a synchronization transformer in communication with the audio source, and configured to receive and transform a synchronization signal based on a second diversity technique; and a plurality of converters each in communication with the encoder, the synchronization transformer, and one of the plurality of antennas, where each of the plurality of converters is configured to combine the encoded data symbol, the encoded pilot symbol, and the transformed synchronization signal into the audio signal to be transmitted on one of the plurality of antennas. The wireless audio receiver may be configured to receive the audio signal on at least one receiving antenna.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
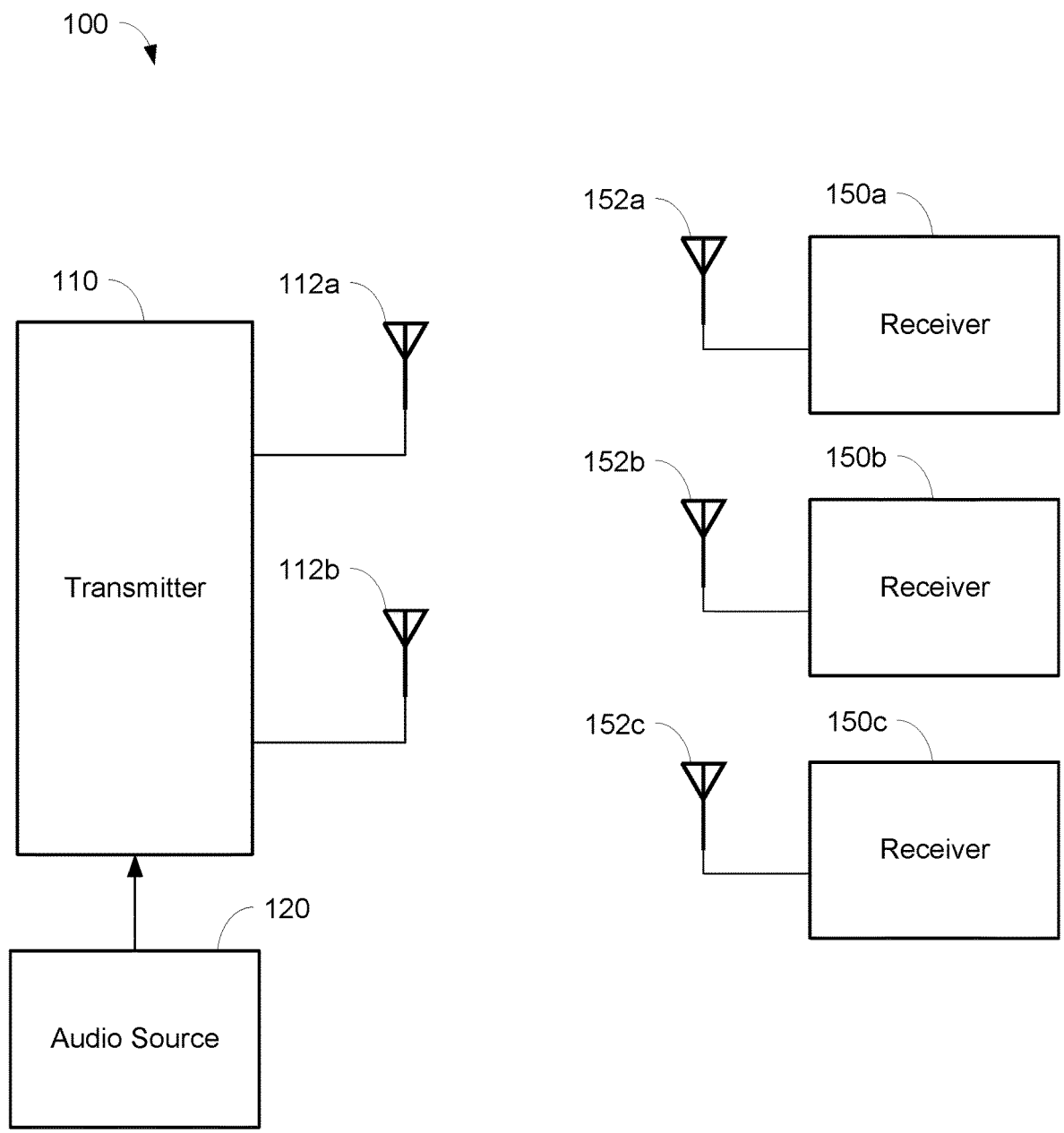
FIG. 1 is a schematic diagram of a wireless audio system utilizing transmit antenna diversity, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The wireless audio system described herein can utilize transmit antenna diversity by including a transmitter that uses multiple antenna diversity techniques for different signal types, in order to attain optimal multipath performance and improved spectral efficiency. The different signal types may include, for example, data symbols including audio data signals and control signals, pilot symbols, and a synchronization signal. The wireless audio transmitter may use orthogonal pilot symbols for independent channel estimation and coherent demodulation. The data rate of the wireless audio system with transmit antenna diversity may be consistent and maintained, as compared to systems with a non-diversity wireless audio transmitter. The number of antennas utilized by the wireless audio transmitter may be selectable, extensible, and scalable to attain greater coverage and/or capacity. In addition, the wireless audio system may still be able to operate with reduced range and/or performance, even if a particular transmit path fails. Performance of the wireless audio system may be more robust in both single zones (e.g., a stage) and in multiple zones (e.g., a stage and backstage).

FIG. 1 is a schematic diagram of an exemplary wireless audio system 100 utilizing transmit antenna diversity. The system 100 may include a wireless audio transmitter 110 having antennas 112a, 112b for transmission of radio frequency (RF) signals, and wireless audio receivers 150a, 150b, 150c having respective antennas 152a, 152b, 152c for receiving the RF signals. The transmitter 110 may utilize antenna diversity due to the multiple antennas 112a, 112b, and as described in more detail below. Antenna diversity can include using physically separated antennas (i.e., antennas positioned apart in space), for example. It is contemplated and possible for the transmitter 110 to have more than two antennas, and for there to be any number of receivers 150. The transmitter 110 may be an access point or other centralized unit, in some embodiments. The receivers 150a, 150b, 150c may be portable wireless audio receivers, in some embodiments, such as a wireless earphone, wireless conference unit, or body pack.

In embodiments, the system 100 may be an OFDM (orthogonal frequency-division multiplexing) wideband audio system that allows various types of traffic to be carried on individual subcarriers and multiplexed together into a single wideband carrier. In other embodiments, the system 100 may be a narrowband audio system, e.g., personal monitoring systems. The RF signals transmitted by the transmitter 110 and received by the receivers 150 may include data symbols having audio data signals and control signals, pilot symbols, and/or synchronization signals, for example. A data symbol may be a QPSK/QAM-modulated subcarrier that can carry the audio data signals and/or control signals, in some embodiments. The pilot symbols may be known symbols that can enable channel estimation and coherent demodulation of the signals at the receivers 150.

As described in more detail below, the data symbols and pilot symbols may be mapped to multiple antennas using space-time block coding (STBC), in some embodiments. Encoding the data symbols and pilot symbols using STBC involves processing a block of symbols and transmitting them multiple times across multiple antennas. In other embodiments, the data symbols and pilot symbols may be transformed using other appropriate techniques.

The synchronization signals may be transmitted from the transmitter 110 so that the receivers 150 can acquire the frequency and/or timing references of the system 100. The transmitter 110 and the receivers 150 generally need to be synchronized with one another so that the data symbols and pilot symbols may be properly transmitted and received. For example, the frequency and phase of the local oscillators of the receivers 150 may need to be synchronized with that of the transmitter 110. As described in more detail below, round-robin switched diversity or cyclic delay diversity (CDD) techniques may be applied to the synchronization signal. Accordingly, the data symbol, the pilot symbol, and the synchronization signal may utilize different antenna diversity techniques.

The system 100 may also include an audio source 120 in communication with the transmitter 110. The audio source 120 may generate one or more audio source signals including the data symbol that has audio data signals and control signals. The transmitter 110 may modulate the data symbol from the audio source 120, and insert the pilot symbols and synchronization symbols prior to transmission of the RF signal(s) on the antennas 112a, 112b.

Figure 2:
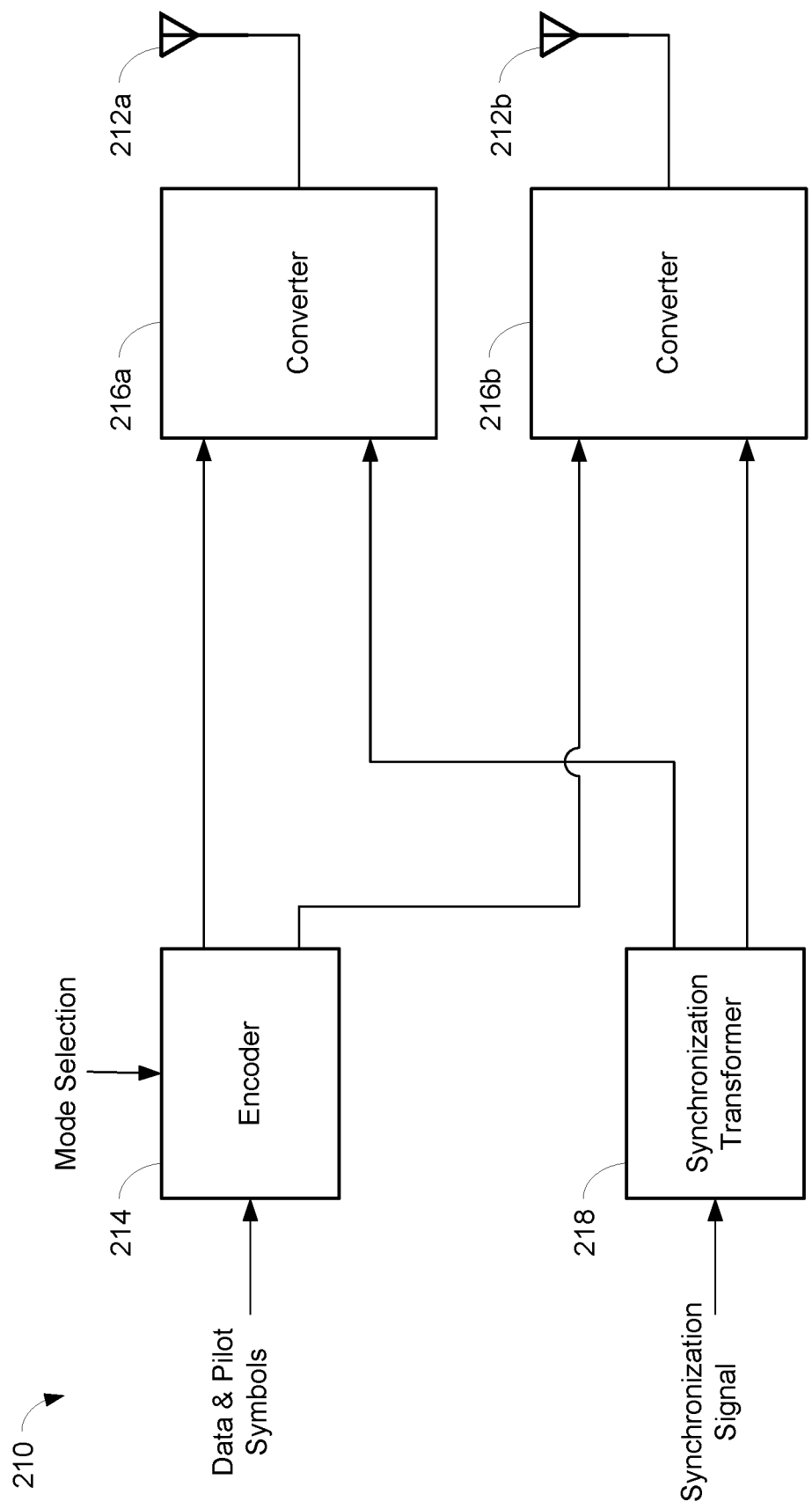
FIG. 2 is a schematic diagram of a portion of a wireless audio transmitter utilizing two antennas for transmit diversity, in accordance with some embodiments.

FIG. 2 is a schematic diagram of a portion of a wireless audio transmitter 210 utilizing two antennas 212a, 212b for transmit diversity. For simplicity, FIG. 2 does not show other components of the transmitter 210, such as modulators, analog to digital converters, digital to analog converters, codecs, etc. The transmitter 210 may transmit RF signals containing data symbols, pilot symbols, and/or synchronization signals for reception by one or more receivers, such as the receivers 150 in the wireless audio system 100 of FIG. 1. Various components included in the wireless audio transmitter 210 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.).

Figure 4:
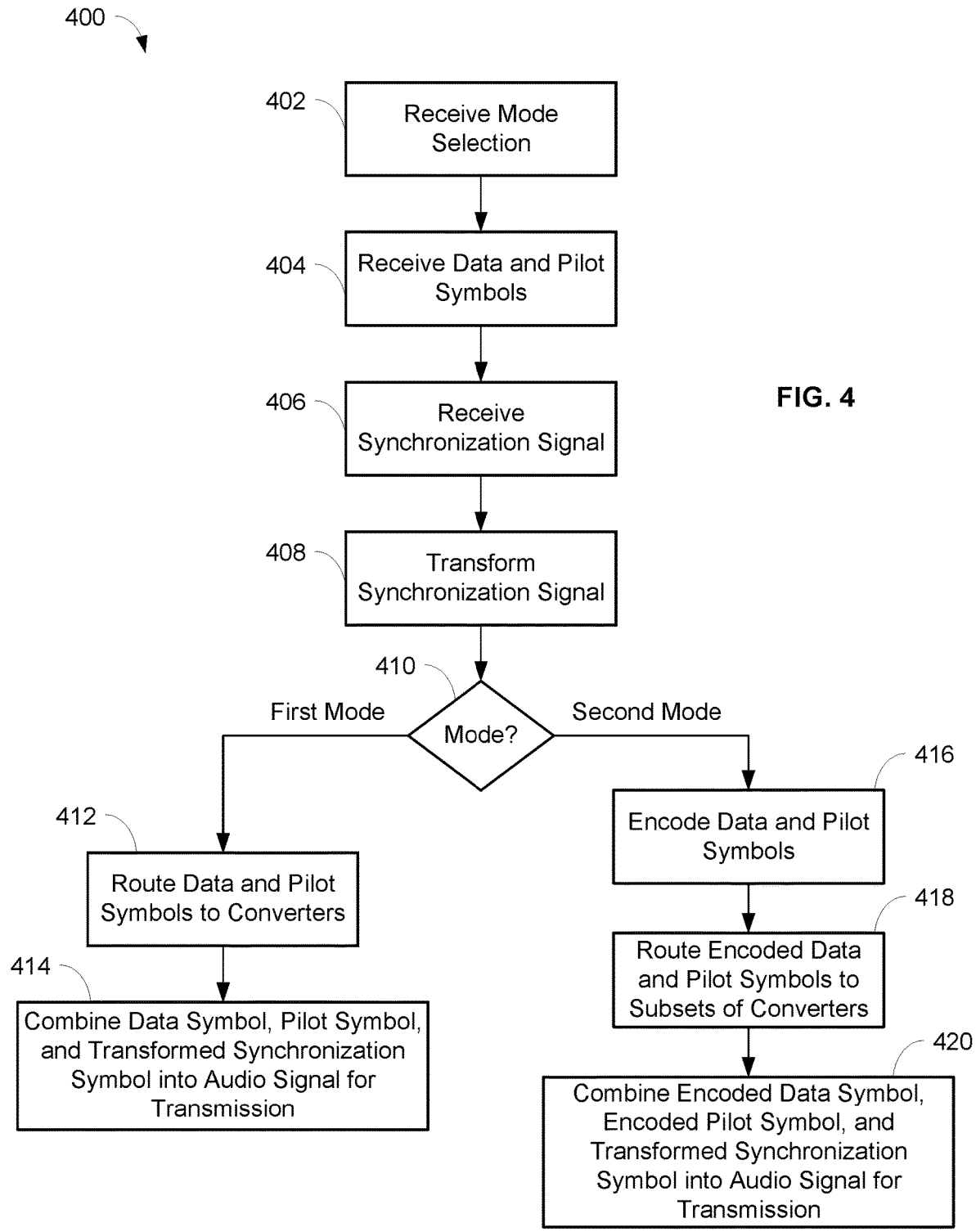
FIG. 4 is a flowchart illustrating operations for wirelessly transmitting an audio signal using a wireless audio transmitter utilizing transmit antenna diversity, in accordance with some embodiments.

An embodiment of a process 400 for wirelessly transmitting an audio signal using a wireless audio transmitter utilizing transmit antenna diversity is shown in FIG. 4. The process 400 may be performed by the transmitter 210. One or more processors and/or other processing components (e.g., analog to digital converters, encryption chips, etc.) within or external to the transmitter 210 may perform any, some, or all of the steps of the process 400. One or more other types of components (e.g., memory, input and/or output devices, transmitters, receivers, buffers, drivers, discrete components, etc.) may also be utilized in conjunction with the processors and/or other processing components to perform any, some, or all of the steps of the process 400.

The transmitter 210 may generate a signal that includes data symbols, pilot symbols, and a synchronization signal for transmission on the antennas 212a, 212b. The data symbols may include audio data signals and/or control signals. The control signals may include system messaging and other information. The encoder 214 may have multiple modes of operation that allow the data symbols and pilot symbols to be encoded and/or routed to be ultimately transmitted on the antennas 212a, 212b. A selection of the mode of the encoder 214 and transmitter 210 may be received at step 402, such as from a user interface. The data symbols and pilot symbols may be received by an encoder 214 at step 404.

Synchronization signals may be in the frequency domain or time domain, and be transformed using cyclic delay diversity (CDD) techniques for transmission on the antennas 212a, 212b. The synchronization signals may be received by a synchronization transformer 218 at step 406. CDD may be applied to the synchronization signals so that nulls do not occur in the radiation pattern of the antennas 212a, 212b. In particular, at step 408, a phase ramp $$e^{-\frac{j2\pi m}{N}}$$

may be applied by the synchronization transformer 218 to transform the synchronization signals in the frequency domain, or the synchronization signals can be transformed by the synchronization transformer 218 using a cyclic delay in the time domain. Accordingly, the first antenna 212a may transmit an original copy of the synchronization signals, while the second antenna 212b may transmit a cyclic shifted version of the synchronization signals. It should be understood that the two antennas 212a, 212b illustrated in FIG. 2 are merely exemplary. In some embodiments, the synchronization signals may be transformed by the synchronization transformer 218 in a round-robin switched diversity scheme.

The data symbols and pilot symbols (whether encoded or not) and the synchronization signals may be combined by converters 216a, 216b, depending on the selected mode at step 410. For example, in a first mode of the transmitter 210, the data symbols and pilot symbols may not be encoded by the encoder 214 and are routed to the converters 216a, 216b at step 412. The converters 216a, 216b may then combine the data symbol, the pilot symbol, and the transformed synchronization signal into an audio signal that is transmitted on the antennas 212a, 212b as an RF signal at step 414. In another example, in a second mode of the transmitter 210, the data symbols and pilot symbols may be encoded by the encoder 214 at step 416 and routed to the converters 216a, 216b at step 418. The converters 216a, 216b may combine the encoded data symbol, the encoded pilot symbol, and the transformed synchronization signal into an audio signal that is transmitted on the antennas 212a, 212b at step 420.

Figures 5, 6:
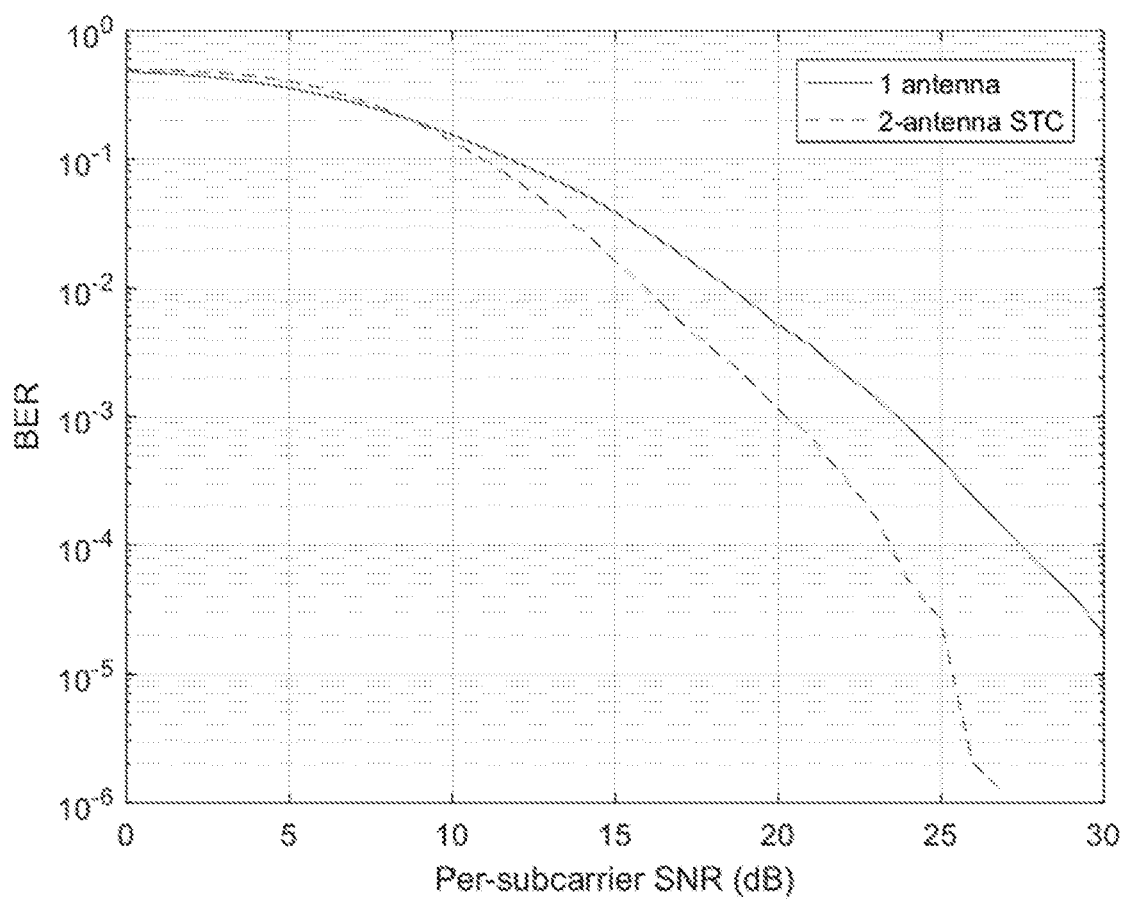
FIG. 5 is a table showing encoding of data symbols and pilot symbols using space-time block coding for use in a wireless audio transmitter utilizing two antennas for transmit diversity, in accordance with some embodiments.
FIG. 6 is an exemplary graph showing the performance of a wireless audio system utilizing two antennas for transmit diversity, in accordance with some embodiments.

In embodiments, the transmitter 210 may be an OFDM wideband transmitter, and the data symbols and pilot symbols may be in the frequency domain and be mapped by space-time block coding (STBC) in the encoder 214. The data symbols may be QPSK/QAM-modulated subcarriers. As shown in the table of FIG. 5, the encoder 214 may process a pair of symbols for transmission on two antennas 212a, 212b. For example, when the input symbol pair for the data subcarrier is $s_{n,0}$, $s_{n,1}$, then the first antenna 212a may transmit the same symbol pair $s_{n,0}$, $s_{n,1}$, while the second antenna 212b may transmit the symbol pair $s^*_{n,0}$, $-s^*_{n,1}$ (i.e., the complex conjugate of the input symbol pair). In particular, the encoder 214 may receive and encode the input symbol pair using STBC, as is known in the art, to generate the symbols for transmission on the antennas 212a, 212b. In embodiments, the code may be a rate-1 STBC (known from Alamouti) or another appropriate code.

The pilot symbols may be known symbols for use in channel estimation and coherent demodulation of the signals at the receivers. In embodiments, the pilot symbols may be orthogonal sequences. As shown in the table of FIG. 5, the STBC encoder 214 may process a pair of values of +1 for the pilot symbols, and generate an orthogonal pilot pattern on the antennas 212a, 212b. For example, when the input symbol pair for the pilot symbol is +1, +1, then the first antenna 212a may transmit the same symbol pair +1, +1, while the second antenna 212b may transmit the symbol pair +1, −1. In embodiments, the pilot symbols may be orthogonal in code, rather than in time or frequency. This may ensure that there is no reduction in capacity since there are unique pilots on multiple antennas. In addition, in embodiments, the pilot symbols may use the same STBC mapping as for the data symbols, which may assist in reducing the complexity of implementation.

One or more receivers, such as the receivers 150a, 150b, 150c, may receive the RF signal transmitted from the transmitter 210 that includes the audio signal on their respective antennas, such as antennas 152a, 152b, 152c. The receivers may demodulate, convert, and/or process the received RF signal to generate an analog or digital output audio signal, as is known in the art. In particular, the receivers may decode the data symbols and pilot symbols based on how they were encoded, e.g., Alamouti rate-1 STBC. In embodiments, the receivers may each have multiple antennas in a spatial diversity scheme that simultaneously receive the transmitted RF signals from the transmitter 210. When both the transmitters and receivers have spatial diversity, multiple-input multiple-output (MIMO) techniques could be utilized. For example, the use of MIMO can result in increased diversity gain for fading mitigation due to lower bit error rates in fading environments. As another example, the use of MIMO can result in higher throughput due to spatial multiplexing, i.e., more bits per frequency.

It can be seen in the exemplary graph of FIG. 6 that the performance of the wireless audio system 100 with two antenna diversity is improved over the performance of a single antenna wireless audio system. In particular, FIG. 6 shows the data bit error rate (BER) performance of the wireless audio system 100 with two antenna diversity (the dashed line) as compared to that of a single antenna wireless audio system (the solid line). Accordingly, at low bit error rates, e.g., less than $10^{-5}$, the wireless audio system 100 with two antenna diversity performs approximately 5 dB better. It should be noted that the graph of FIG. 6 reflects that the combined transmission power of the wireless audio system 100 with two antenna diversity is equal to the transmission power of the signal antenna wireless audio system.

Figure 3:
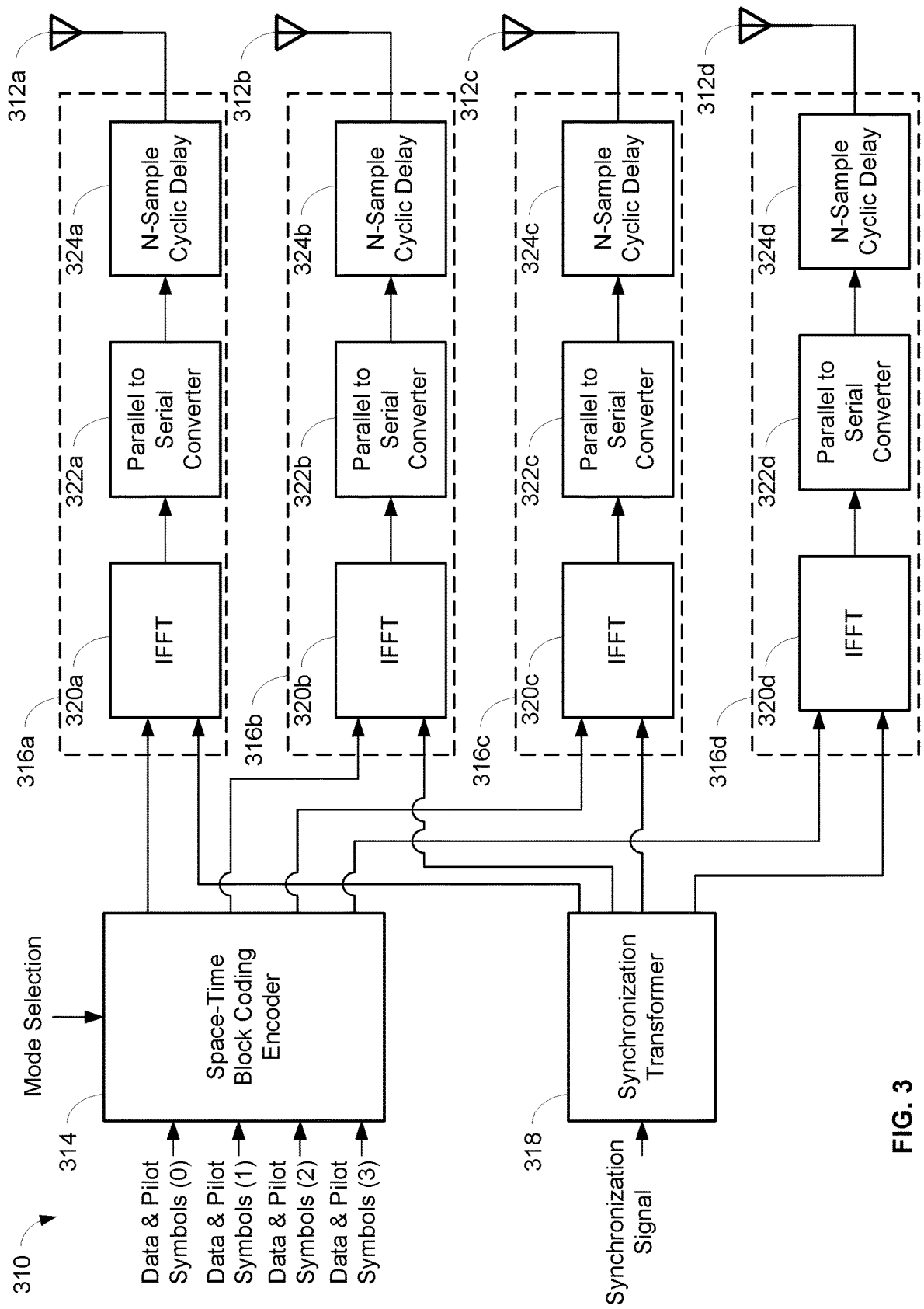
FIG. 3 is a schematic diagram of a portion of a wireless audio transmitter utilizing four antennas for transmit diversity, in accordance with some embodiments.

FIG. 3 is a schematic diagram of a portion of an OFDM wideband wireless audio transmitter 310 utilizing four antennas 312a, 312b, 312c, 312d for transmit diversity. For simplicity, FIG. 3 does not show other components of the transmitter 310, such as modulators, analog to digital converters, digital to analog converters, codecs, etc. The transmitter 310 may transmit RF signals containing data symbols, pilot symbols, and/or synchronization signals for reception by one or more receivers, such as the receivers 150 in the wireless audio system 100 of FIG. 1. Various components included in the wireless audio transmitter 310 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.).

Similar to the transmitter 210 in FIG. 2, the transmitter 310 may generate a signal that includes data symbols, pilot symbols, and a synchronization signal for transmission on the antennas 312a, 312b, 312c, 312d. The data symbols may include audio data signals and/or control signals. The control signals may include system messaging and other information. The data symbols and pilot symbols in the transmitter 310 may be in the frequency domain, and be mapped by a space-time-block coding (STBC) encoder 314. In embodiments, the STBC encoder 314 may utilize Alamouti rate-1 STBC, a quasi-orthogonal rate-1 STBC (known from Jafarkhani), an orthogonal rate-3/4 STBC (known from Ganesan), or other appropriate codes. The synchronization signal may be in the frequency domain or the time domain, and be transformed using cyclic delay diversity (CDD) techniques for transmission on the antennas 312a, 312b, 312c, 312d. Alternatively, the synchronization signal may be transmitted in a round-robin switched diversity scheme on the antennas 312a, 312b, 312c, 312d. A detailed description is omitted of the functionality of the synchronization transformer 318 of FIG. 3 that is the same or similar as the synchronization transformer 218 of FIG. 2.

The embodiment of the process 400 shown in FIG. 4 may also be performed by the transmitter 310. One or more processors and/or other processing components (e.g., analog to digital converters, encryption chips, etc.) within or external to the transmitter 310 may perform any, some, or all of the steps of the process 400. One or more other types of components (e.g., memory, input and/or output devices, transmitters, receivers, buffers, drivers, discrete components, etc.) may also be utilized in conjunction with the processors and/or other processing components to perform any, some, or all of the steps of the process 400.

The STBC encoder 314 may have multiple modes of operation that allow the data symbols and pilot symbols to be encoded and/or routed to be ultimately transmitted on the antennas 312a, 312b, 312c, 312d. A selection of the mode of the STBC encoder 314 and transmitter 310 may be received at step 402, such as from a user interface. The selected mode may determine the type of mapping (if any) and the routing performed by the STBC encoder 314. In embodiments, the transmitter 310 may have three modes, while in other embodiments, the transmitter 310 may have another number of modes. The number of modes of the transmitter 310 may be dependent on the number of antennas, the number of coverage zones, and/or the number of audio channels.

Figure 7A:
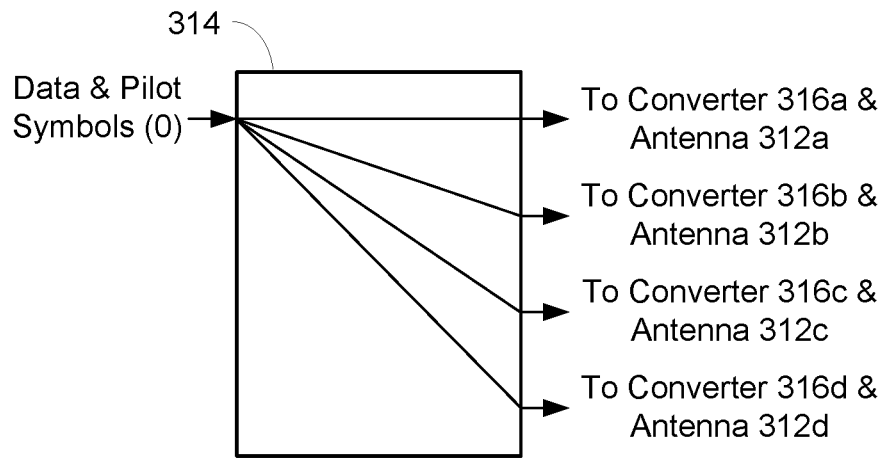
FIGS. 7A, 7B, 8A, 8B, and 9 are exemplary depictions of the encoding and/or routing of audio channels to converters and antennas in different modes of a wireless audio transmitter, in accordance with some embodiments.
Figure 7B:
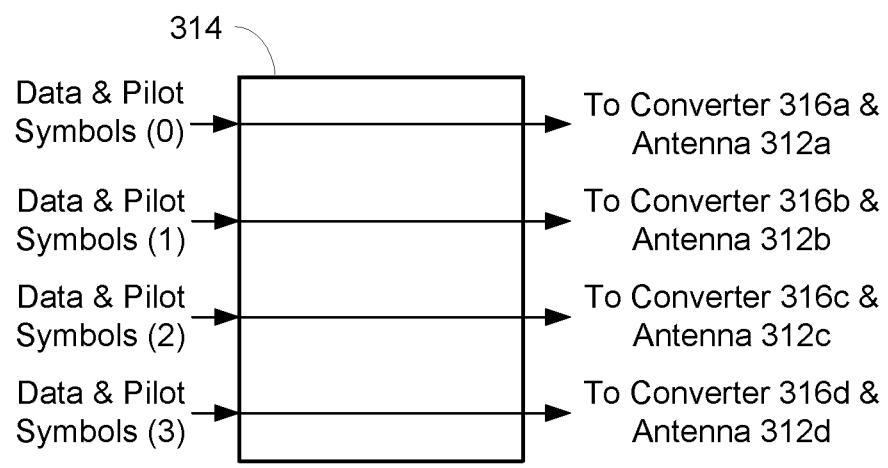

A first mode of the transmitter 310 may cause the STBC encoder 314 to receive (step 404) and route (step 412) the data symbols and pilot symbols to converters 316a, 316b, 316c, 316d in respective communication with the antennas 312a, 312b, 312c, 312d, without any STBC mapping. This mode may route up to N audio channels to N coverage zones, where N is equal to the number of antennas. As such, for the transmitter 310, up to four audio channels can be routed to four coverage zones. For example, in this mode, the STBC encoder 314 may route one audio channel (i.e., one stream of data symbols and pilot symbols) to four single-antenna coverage zones, such as depicted in FIG. 7A. This mode may enable coverage of multiple zones, such as along a parade route. As another example, in this mode, the STBC encoder 314 may route four unique audio channels (i.e., four separate streams of data symbols and pilot symbols) to four respective single-antenna coverage zones, such as depicted in FIG. 7B.

Figure 8A:
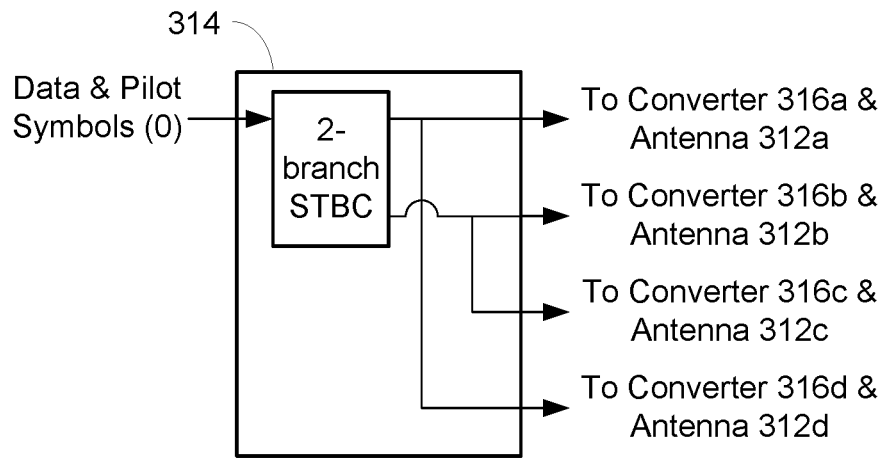
Figure 8B:
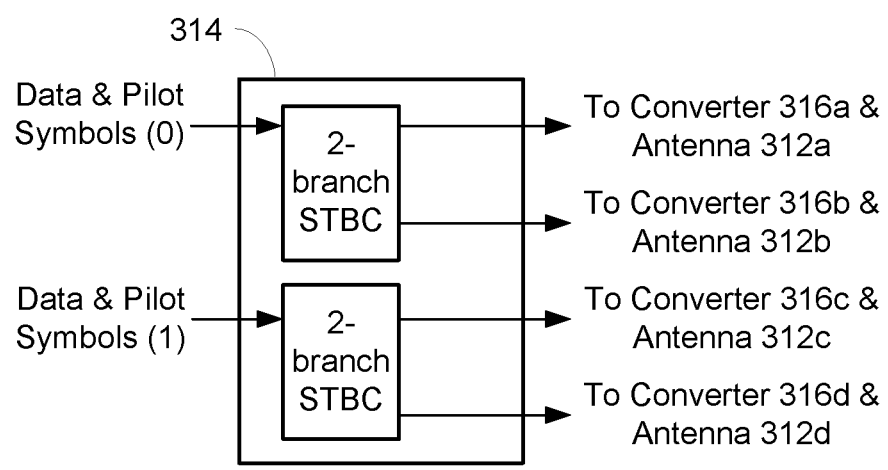

A second mode of the transmitter 310 may cause the STBC encoder 314 to receive (step 404) and encode (step 416) the data symbols and pilot symbols with 2-branch STBC mapping. The encoded data symbols and pilot symbols may be routed (step 418) to converters 316a, 316b, 316c, 316d in respective communication with the antennas 312a, 312b, 312c, 312d. This mode may encode and route up to N/2 audio channels to N/2 coverage zones, e.g., for the transmitter 310, up to two audio channels can be encoded and routed to two coverage zones. For example, in this mode, the STBC encoder 314 may encode and route one audio channel (i.e., one stream of data symbols and pilot symbols) to two coverage zones each having two antennas, such as depicted in FIG. 8A. In particular, one coverage zone may be covered by antennas 312a, 312b and the other coverage zone may be covered by antennas 312c, 312d. As another example, in this mode, the STBC encoder 314 may encode and route two unique audio channels (i.e., two separate streams of data symbols and pilot symbols) to two respective coverage zones each having two antennas, such as depicted in FIG. 8B.

Figure 9:
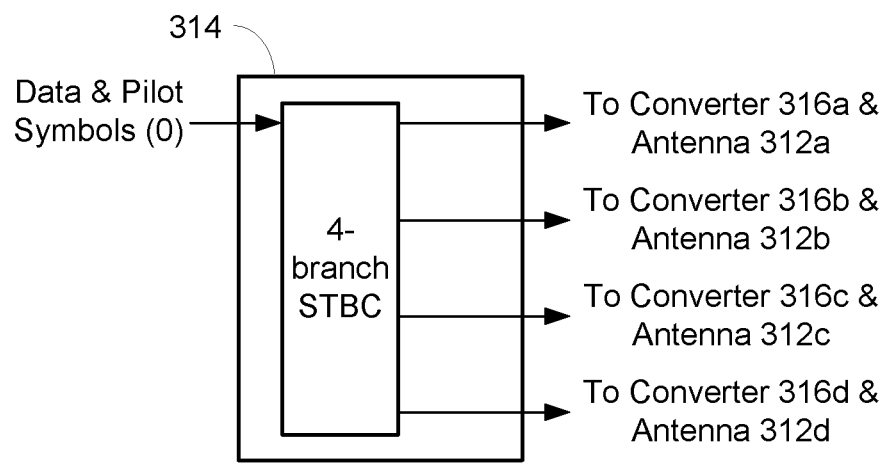

A third mode of the transmitter 310 may cause the STBC encoder 314 to receive (step 404) and encode (step 416) the data symbols and pilot symbols with 4-branch STBC mapping. The encoded data symbols and pilot symbols may be routed (step 418) to converters 316a, 316b, 316c, 316d in respective communication with the antennas 312a, 312b, 312c, 312d. This mode may encode and route up to N/4 audio channels to N/4 coverage zones, e.g., for the transmitter 310, up to one audio channel can be encoded and routed to one coverage zone. For example, in this mode, the STBC encoder 314 may encode and route one audio channel (i.e., one stream of data symbols and pilot symbols) to one coverage zone that has four antennas, such as depicted in FIG. 9.

The converters 316a, 316b, 316c, 316d may combine the data symbols, pilot symbols, and the synchronization signals, such as in the first mode described above where there is no encoding (step 414); or combine the encoded data symbols, encoded pilot symbols, and the synchronization signals, such as in the second and third modes described above (step 420). The converters 316a, 316b, 316c, 316d may generate an audio signal that is transmitted on the antennas 312a, 312b, 312c, 312d, respectively.

Each of the converters 316a, 316b, 316c, 316d may include inverse fast Fourier transforms (IFFTs) 320a, 320b, 320c, 320d to convert the data symbols and pilot symbols into the time domain. The output of the synchronization transformer 318, i.e., the transformed synchronization signal, may also be communicated to the IFFTs 320a, 320b, 320c, 320d. The outputs of the respective IFFTs 320a, 320b, 320c, 320d may be converted by parallel to serial converters 322a, 322b, 322c, 322d. In order to transmit the audio signal on the antennas 312a, 312b, 312c, 312d, a cyclic delay 324a, 324b, 324c, 324d may be applied to the output of the parallel to serial converters 322a, 322b, 322c, 322d. Each cyclic delay may result in a unique time shift on each antenna. In particular, the output of the parallel to serial converters 322a, 322b, 322c, 322d may include data symbols, pilot symbols, and synchronization signals in the time domain, i.e., after conversion by the IFFTs 320a, 320b, 320c, 320d. As discussed previously, the data symbols and pilot symbols may have been encoded in certain modes, and may not have been encoded in other modes.

One or more receivers, such as the receivers 150a, 150b, 150c, may receive the RF signal transmitted from the transmitter 310 that includes the audio signal on their respective antennas, such as antennas 152a, 152b, 152c. The receivers may demodulate, convert, and/or process the received RF signal to generate an analog or digital output audio signal, as is known in the art. In particular, the receivers may decode the data symbols and pilot symbols based on how they were encoded, e.g., Alamouti rate-1 STBC, quasi-orthogonal Jafarkhani rate-1 STBC, orthogonal Ganesan rate-3/4 STBC. In embodiments, the receivers may each have multiple antennas in a spatial diversity scheme that simultaneously receive the transmitted RF signals from the transmitter 310.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless audio transmitter, comprising:
   (A) a mode selection interface for enabling a user to select one of a plurality of modes of the wireless audio transmitter;
   (B) a plurality of antennas configured to each transmit an audio signal;
   (C) an encoder in communication with the mode selection interface, the encoder configured to receive (i) a data symbol comprising audio data signals and control signals and (ii) a pilot symbol, the encoder further configured to:
      (1) when in a first mode, receive and route the data symbol and the pilot symbol to each of a plurality of converters; and
      (2) when in a second mode:
         receive and encode the data symbol and the pilot symbol based on a first diversity technique; and
         route the encoded data symbol and the encoded pilot symbol to one or more subsets of the plurality of converters;
   (D) a synchronization transformer configured to receive and transform a synchronization signal based on a second diversity technique; and
   (E) the plurality of converters each in communication with the encoder, the synchronization transformer, and one of the plurality of antennas, wherein each of the plurality of converters is configured to:
      (1) when in the first mode, combine the data symbol, the pilot symbol, and the transformed synchronization signal into the audio signal to be transmitted on one of the plurality of antennas; and
      (2) when in the second mode, combine the encoded data symbol, the encoded pilot symbol, and the transformed synchronization signal into the audio signal to be transmitted on one of the plurality of antennas.

2. The wireless audio transmitter of claim 1, wherein the first diversity technique comprises space-time block coding in the frequency domain.

3. The wireless audio transmitter of claim 2, wherein the space-time block coding comprises an Alamouti rate-1 code.

4. The wireless audio transmitter of claim 1, wherein the synchronization transformer comprises a phase shifter and the second diversity technique comprises transforming the synchronization signal by applying a phase ramp to the synchronization signal using the phase shifter.

5. The wireless audio transmitter of claim 1, wherein the second diversity technique comprises a round robin switched diversity scheme.

6. The wireless audio transmitter of claim 1, wherein the pilot symbols are orthogonal.

7. The wireless audio transmitter of claim 1, wherein each of the plurality of converters comprises an inverse Fast Fourier Transform and a parallel to serial converter.

8. The wireless audio transmitter of claim 1, wherein each of the plurality of converters comprises a cyclic delay module, wherein an amount of delay of the cyclic delay module is dependent on a selected mode of the plurality of modes.

9. The wireless audio transmitter of claim 1, wherein:
   the audio signal is transmitted on a first subset of the plurality of antennas configured to cover a first zone; and
   the audio signal is transmitted on a second subset of the plurality of antennas configured to cover a second zone.

10. A method for wirelessly transmitting an audio signal using a wireless audio transmitter, the method comprising:
   (A) receiving, from a mode selection interface, a selection of one of a plurality of modes of the wireless audio transmitter;
   (B) receiving, at an encoder, (i) a data symbol comprising audio data signals and control signals and (ii) a pilot symbol;
   (C) when the selection is of a first mode, routing the data symbol and the pilot symbol to each of a plurality of converters, using the encoder;
   (D) when the selection is of a second mode:
      encoding the data symbol and the pilot symbol based on a first diversity technique, using the encoder; and
      routing the encoded data symbol and the encoded pilot symbol to one or more subsets of the plurality of converters, using the encoder;
   (E) receiving, at a synchronization transformer, a synchronization signal;
   (F) transforming the synchronization signal based on a second diversity technique, using the synchronization transformer;
   (G) when the selection is of the first mode, combining the data symbol, the pilot symbol, and the transformed synchronization signal into the audio signal to be transmitted on one of the plurality of antennas, using each of the plurality of converters; and
   (H) when the selection is of the second mode, combining the encoded data symbol, the encoded pilot symbol, and the transformed synchronization signal into the audio signal to be transmitted on one of the plurality of antennas, using the one or more subsets of the plurality of converters.

11. The method of claim 10, wherein the first diversity technique comprises space-time block coding in the frequency domain.

12. The method of claim 11, wherein the space-time block coding comprises an Alamouti rate-1 code.

13. The method of claim 10, wherein transforming the synchronization signal based on the second diversity technique comprises transforming the synchronization signal by applying a phase ramp to the synchronization signal using a phase shifter in the synchronization transformer.

14. The method of claim 10, wherein the second diversity technique comprises a round robin switched diversity scheme.

15. The method of claim 10, wherein the pilot symbols are orthogonal.

16. The method of claim 10, wherein:
combining the data symbol, the pilot symbol, and the transformed synchronization signal when the selection is of the first mode comprises combining using an inverse Fast Fourier Transform and a parallel to serial converter in each of the plurality of converters; and
combining the encoded data symbol, the encoded pilot symbol, and the transformed synchronization signal when the selection is of the second mode comprises combining using the inverse Fast Fourier Transform and the parallel to serial converter in each of the plurality of converters.

17. The method of claim 10:
wherein combining the data symbol, the pilot symbol, and the transformed synchronization signal when the selection is of the first mode comprises combining using a cyclic delay module in each of the plurality of converters;
wherein combining the encoded data symbol, the encoded pilot symbol, and the transformed synchronization signal when the selection is of the second mode comprises combining using the cyclic delay module in each of the plurality of converters; and
wherein an amount of delay of the cyclic delay module is dependent on a selected mode of the plurality of modes.

18. The method of claim 10, further comprising:
transmitting the audio signal on a first subset of the plurality of antennas configured to cover a first zone; and
transmitting the audio signal on a second subset of the plurality of antennas configured to cover a second zone.

19. A wireless audio system, comprising:
an audio source configured to generate one or more audio source signals each comprising a data symbol comprising audio data signals and control signals;
a wireless audio transmitter in communication with the audio source, the wireless audio transmitter comprising:
(A) a plurality of antennas configured to each transmit an audio signal;
(B) an encoder in communication with the audio source, the encoder configured to receive and encode the data symbol and a pilot symbol based on a first diversity technique;
(C) a synchronization transformer in communication with the audio source, the synchronization transformer configured to receive and transform a synchronization signal based on a second diversity technique; and
(D) a plurality of converters each in communication with the encoder, the synchronization transformer, and one of the plurality of antennas, wherein each of the plurality of converters is configured to combine the encoded data symbol, the encoded pilot symbol, and the transformed synchronization signal into the audio signal to be transmitted on one of the plurality of antennas; and
a wireless audio receiver in wireless communication with the wireless audio transmitter, the wireless audio receiver configured to receive the audio signal on at least one receiving antenna.

20. The wireless audio system of claim 19, wherein the first diversity technique comprises space-time block coding in the frequency domain and the second diversity technique comprises a round robin switched diversity scheme.

21. The wireless audio system of claim 19, wherein the audio signal is transmitted by the wireless audio transmitter to the wireless audio receiver via a multiple-input multiple-output scheme.

22. The wireless audio system of claim 21, wherein the at least one receiving antenna of the wireless audio receiver comprises a plurality of receiving antennas.

* * * * *